United States Patent Office 3,552,999
Patented Jan. 5, 1971

3,552,999
ADHESIVE COMPOSITION AND RUBBER-POLY-
ESTER COMPOSITION BONDED THEREWITH,
COMPRISING POLYESTER - POLYURETHANE
WITH ETHYLENIC UNSATURATION
Takeo Shima, Yukiharu Asami, Shunzo Ishizaki, Shoji
Kawase, and Masao Yoshimura, Iwakuni-shi, Japan, assignors to Teijin Limited, Osaka, Japan, a corporation
of Japan
No Drawing. Continuation of application Ser. No. 697,586,
Jan. 15, 1968, which is a continuation-in-part of
abandoned application Ser. No. 612,335, Jan. 30, 1967.
This application July 23, 1969, Ser. No. 844,198
Claims priority, application Japan, Feb. 2, 1966,
41/6,057; May 16, 1966, 41/31,310, Nov. 9,
1966, 41/73,672; Jan. 16, 1967, 42/2,996
Int. Cl. B32b 25/08, 27/08, 27/31
U.S. Cl. 117—76            8 Claims

ABSTRACT OF THE DISCLOSURE

Improvement in bonding of articles, such as tire cord, of ethylene terephthalate or ethylene 2,6-naphthalate polyester to rubbers. The article is coated with a polyester-polyurethane polymer, characterized in that the polyester segments in said polyester-polyurethane are derived from an ethylene terephthalate polyester or ethylene 2,6-naphthalate polyester and the remaining segments contain ethylenic unsaturations in an amount of at least one per 500 of the molecular weight of said polyester-polyurethane polymer. The ratio of the polyester segments in said polyester-polyurethane is $\frac{1}{7}$ to $\frac{6}{7}$ by weight. The article is then heated to a temperature above 100° C. and bonded to rubber by a method known per se. Thus, a firm bonding between the article and rubber can be obtained. The bonding can be further strengthened by the help of an adhesive agent such as a resorcinol-Formalin/latex.

This application is a continuation application of application Ser. No. 697,586, filed Jan. 15, 1968, which is in turn a continuation-in-part of application Ser. No. 612,-335, filed Jan. 30, 1967, and now abandoned.

This invention relates to a process for bonding a shaped article of a crystalline polyester having a high melting point such as polyethylene terephthalate filament, yarn, cord and cord fabric to rubbers and an adhesive composition suitable for said bonding.

Despite the fact that a polyester shaped article, especially synthetic filament material of the polyester series has on one hand most desirable properties as rubber reinforcing materials such as excellent tensile strength, impact strength, elongation resistance, dimensional stability, heat resistance, chemical resistance, water resistance, bacterial resistance and weather resistance. On the other hand, because the molecular structure of a polyester is low in functionality, it has hitherto been impossible to obtain satisfactory adhesion between polyesters and rubber.

As an adhering method of fibrous material of the polyester series to rubbers, various methods have heretofore been proposed. These methods are, for instance, a method of treating a polyester filament with a treating liquid wherein compounds such as isocyanates and ethylene urea are dissolved or dispersed, thereafter adhering the filament to rubbers. However, these methods require a large amount of a treating agent, are expensive and quite often the effects thereof in actual uses are insufficient.

The present invention provides an improved process for bonding to rubber a shaped article made from a crystalline ethylene terephthalate polyester wherein at least 60 mol percent of the structural units consist of ethylene terephthalate units or a crystalline ethylene 2,6-naphthalate polyester wherein at least 60 mol percent of the structural units consist of ethylene 2,6-naphthalate units, which process comprises (1) Applying to the article a coating of a polyester-polyurethane in which the polyester segments (a) constitute $\frac{1}{7}$ to $\frac{6}{7}$ by weight of the polyester-polyurethane and (b) are derived from said ethylene terephthalate polyester when the shaped article is of a crystalline ethylene terephthalate polyester and are derived from said ethylene 2,6-naphthalate polyester when the shaped article is of a crystalline ethylene 2,6-naphthalate polyester, and in which the remaining segments contain ethylenic unsaturations, the amount of said ethylenic unsaturations being at least one per 500 of the molecular weight of said polyester-polyurethane;

(2) Heating the coated article at a temperature below the melting point of the coated article but not below 100° C.; and (3) Bonding the resultant article to rubber by a method known per se.

The term "rubbers" as referred to in this specification and claims mean substances having in their molecules sulfur-curable ethylenic unsaturation and being capable of being converted to elastomers by normal vulcanization. Among the rubbers there are polymers of isoprene such as natural rubbers; polymers of butadiene such as polybutadiene, a butadiene-styrene copolymer and a butadiene-acrylonitrile copolymer; polymers of chloroprene such as neoprene; and the like rubbery material. The bonding of a polyester shaped article to rubbers is normally completed simultaneously with vulcanization of the rubbers. "Adhering of a polyester shaped article to rubbers" referred to in the specification and claims of this application should be understood in this significance.

The term "a crystalline polyester having a high melting point" means an ethylene terephthalate polyester or an ethylene 2,6-naphthalate polyester. The term "an ethylene terephthalate polyester" referred to in the specification and claims of this application means a homopolyester or copolyester at least 60 mol percent of which being ethylene terephthalate unit; the term "an ethylene 2,6-naphthalate polyester" means a homopolyester or copolyester at least 60 mol percent of which is ethylene 2,6-naphthalate unit.

As examples of an acid component for a copolyester, there may be cited difunctional acids such as terephthalic acid (in the case of an ethylene 2,6-naphthalate polyester), isophthalic acid, β-hydroxyethoxybenzoic acid, naphthalenedicarboxylic acid (in the case of an ethylene terephthalate polyester), diphenyldicarboxylic acid and sebacic acid; and as a glycol components for modification, aliphatic, alicyclic and aromatic dihydroxy compounds such as trimethylene glycol, hexamethylene glycol, neopentylene glycol, polyethylene glycol, 1,4-bishydroxyethoxy benzene and bisphenol-A may be cited. Also, ethylene terephthalate polyesters and ethylene 2,6-naphthalate polyesters may be modified by a chain terminating agent having one ester-forming functional group such as, for instance, benzoic acid, benzoylbenzoic acid and methoxypolyethylene glycol and/or a chain branching agent having at least three ester-forming functional groups such as, for instance, glycerol, pentaerythritol and trimethylol propane.

"Of the same series" as referred to hereinafter means, when a shaped article comprises an ethylene terephthalate polyester defined above, a polyester-polyurethane containing polyester segments derived from said ethylene terephthalate polyester is used as an adhesive agent, and when a shaped article comprises an ethylene 2,6-naphthalate polyester defined above, a polyester-polyurethane containing polyester segments derived from said ethylene 2,6-naphthalate polyester is used as an adhesive agent.

The adhesive agent of this invention consists of (1) a polyester-polyurethane in which the polyester segments (a) constitute ⅐ to %⁷ by weight of the polyester-polyurethane and (b) are derived from a crystalline ethylene terephthalate polyester wherein at least 60 mol percent of the structural units consist of ethylene terephthalate units or a crystalline ethylene 2,6-naphthalate polyester wherein at least 60 mol percent of the structural units consist of ethylene 2,6-naphthalate units, and in which the remaining segments contain ethylenic unsaturations, the amount of said ethylenic unsaturations being at least one per 500 of the molecular weight of said polyester-polyurethane and (2) an organic liquid and/or water, said polyester-polyurethane being dissolved or dispersed into said organic liquid and/or water. For instance, it may be produced by reacting according to the conventional method an organic diisocyanate, a difunctional chain extender containing ethylenic unsaturations in its molecule and a crystalline polyester having a high melting point defined above.

As diisocyanate, what has been hitherto used for production of polymers of the polyester-polyurethane will do and there is no particuar restriction. Examples of very generally used diisocyanate are toluylene diisocyanate, diphenylmethane diisocyanate and hexamethylene diisocyanate.

Instead of all or part of diisocyanate used for the preparation of said polyester polyurethane polymer, an organic dithiocyanate such as toluylene diisothiocyanate, para-phenylene diisothiocyanate and tetramethylene dithiocyanate may be used. Also instead of a part of said diisocyanate, a triisocyanate such as 1-methylbenzene-2,4,6-triisocyanate, triphenylmethane triisocyanate and diphenylmethane-2,4,4'-triisocyanate may be used. Accordingly, as used throughout, the term "diisocyanates" is meant to embrace the aforenoted dithioisocyanates.

A crystalline polyester having a high melting point of which at least 60% is an ethylene terephthalate unit or an ethylene 2,6-naphthalate unit suitable for production of a polyester polyurethane polymer of this invention preferably has a reduced viscosity ($\eta_{sp./c.}$) of about 0.07 to 0.4 when measured at 35° C. at a concentration of 1.2 g./100 cc. in o-chlorophenol. In the case of an ethylene terephthalate polyester, those having a reduced viscosity of about 0.10 to 0.30 are especially preferable, said viscosity value corresponding to an average degree of polymerization of about 5 to 40. And for obtaining a polyester-polyurethane polymer excellent as an adhesive agent for bonding a shaped article of polyethylene terephthalate to rubber, it has been found preferable to use an ethylene terephthalate polyester modified by a small amount of chain branching agent having 3 or 4 ester-forming functional group for instance, an ethylene terephthalate polyester modified by up to about 2 mol percent, preferably about 0.4–1.5 mol percent of pentaerythritol based on the terephthalic acid component) rather than using a non-modified polyethylene terephthalate.

In the formation of the polyester-polyurethane to be used in this invention, a chain extender containing ethylenic unsaturation in its molecule is used together wth said diisocyanate and said crystalline polyester having a high melting point. Examples of such chain extender include alkene diols such as butene diol, hexene diol, hexadiene diol, cyclohexene diol, cyclohexadiene diol and cyclohexene dimethanol; an unsaturated polyester having a low degree of polymerization such as polyethylene maleate, polyethylene fumarate, polyethylene itaconate and polybutene maleate; an unsaturated polyether having a low degree of polymerization such as a compound of the formula

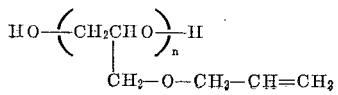

wherein $n$ is 1–50 obtained by ring-opening polymerizing allylglycidylether; and poly (diene) glycol such as polybutadiene glycol and polyisoprene glycol as well as poly (diene) glycols wherein up to 40 mol percent vinyl comonomers, e.g., styrene and acrylonitrile, are incorporated by copolymerization. Besides these unsaturated diols, as a difunctional chain extender for introducing ethylenical unsaturation, poly (diene) dicarboxylic acids such as polyisoprene dicarboxylic acid, as well as bis-epoxypoly (diene) such as bis-epoxy polybutadiene are similarly effective. The adhesive agents to be used in this invention suitable for use in direct adhesion of an ethylene terephthalate polyester to rubbers are polyester-polyurethane polymers containing polyester segments derived from an ethylene terephthalate polyester at such a ratio that the weight ratio of said polyester segments to the remaining segments is within the range of 1:6 to 6:1, preferably 1:4 to 4:1, said remaining segments having at least one ethylenic unsaturation per 500 of the molecular weight, preferably per 300 of the molecular weight of the polyester-polyurethane polymer.

For the preparation of the above-mentioned polyester-polyurethane, a part, preferably less than 80 mol percent, of said chain extender containing ethylenic unsaturation in its molecules can be substituted by an ordinary difunctional chain extender which does not contain ethylenic unsaturation in its molecules. Such ordinary chain extender includes ethylene glycol, tetramethylene glycol, decamethylene glycol, propylene glycol, triethylene glycol, ethylene diamine, hexamethylene diamine, decamethylene diamine, benzidine, ethanol amine, sebacic dihydrazide, isophthalic dihydrazide, hydrazine, polysebacic hydrazide from sebacyl dichloride and hydrazine and the like. Instead of a part of these ordinary difunctional chain extenders, a polyfunctional chain extender such as pentaerythritol, trimethylol propane and 1,2,6-hexanetriol; and high molecular weight diols, e.g., polyether diols such as polyethylene glycol, polypropylene glycol and a block copolymer of polyethylene glycol with polypropylene glycol and/or polyester diols such as polytetramethylene adipate and polyethylene sebacate may be used. However, when such high molecular weight polyethers or polyesters are used, it is preferable to use them in an amount not exceeding 60% by weight of a total amount of the chain extender.

Production of the polyester-polyurethane polymer is not limited to any particular process, but either one of a process of reacting simultaneously a crystalline polyester having a high melting point, another difunctional compound and diisocyanate, a process of reacting a difunctional compound with a diisocyanate to prepare a compound having an isocyanate terminal group, subsequently reacting said latter compound with a crystalline polyester having a high melting point, or a process of reacting a crystalline polyester having a high melting point with diisocyanate to prepare a polyester having an isocyanate terminal group, subsequently reacting the same with a difunctional compound, will do.

The preparation of the polyester-polyurethane polymer may be carried out in a molten state; however, in many cases it is advantageous to carry out the reaction in an inert organic solvent.

Suitable solvents include those which are inert to an isocyanate compound and which dissolve both the polyester and polyester-polyurethane product (for instance, dimethyl sulfoxide, and dimethyl formamide) may be used. Also a tertiary amino compound such as triethylene diamine may be used as a catalyst in the reaction. It is preferable that the reaction is carried out at a temperature below 200° C. At higher temperatures dissociation of a urethane bond becomes remarkable, making it difficult to produce the intended product.

By changing the ratio of the total of isocyanate terminal groups to the total of the corresponding active hydrogen atoms of the starting materials to be charged into the reaction vessel, degree of polymerization of a polymer to be produced can be properly changed; however, generally it is preferable to adjust the ratio within the range of from 0.8 to 1.3.

In the polyester-polyurethane polymer used in this invention, the weight ratio of the polyester segments derived from the crystalline polyester having a high melting point to the remaining segments such as urethane- and/or polyurethane-segments should be 1:6–6:1, especially 1:4–4:1 as mentioned before. Those polymethanes having the weight ratios outside said range have insufficient adhesive ability in bonding the polyester shaped article to rubber.

Alternatively, the polyester-polyurethane polymer containing polyester segments of a crystalline polyester having a high melting point may also be produced by a process which comprises producing a polyurethane having amino terminal groups from a bis-chloroformate such as ethylene-bis-chloroformic acid and a diamine such as 4,4'-diaminodiphenylmethane, separately producing a polyester having isocyanate terminal groups from an ethylene terephthalate or an ethylene 2,6-naphthalate polyester and an organic diisocyanate, thereafter reacting said polyurethane with said polyester to block the two.

The polyester articles treated with the above-mentioned adhesive agent containing ethylenic unsaturation, when subjected to vulcanizing conditions together with a rubber material, would give well bonded composite articles. In vulcanizing such articles, a vulcanization accelerator such as thiuram and peroxides is preferably used together with a vulcanizing agent.

Heretofore, resorcinol Formalin latex prepared by dispersing a condensate of resorcinol and formaldehyde into a rubber latex is usually used when a shaped article made from regenerated cellulose or polyamide is bonded to rubber. The resorcinol Formalin latex, however, is not effective by itself in bonding a shaped article of a crystalline polyester to rubber. On the other hand, the adhesive agent of this invention consisting of (1) a polyester-polyurethane in which the polyester segments (a) constitute $\frac{1}{7}$ to $\frac{6}{7}$ by weight of the polyester-polyurethane and (b) are derived from a crystalline ethylene terephthalate polyester wherein at least 60 mol percent of the structural units consist of ethylene terephthalate units or a crystalline ethylene 2,6-naphthalate polyester wherein at least 60 mol percent of the structural units consist of ethylene 2,6-naphthalate units, and in which the remaining segments contain ethylenic unsaturations, the amount of said ethylenic unsaturations being at least one per 500 of the molecular weight of said polyester-polyurethane and (2) an organic liquid and/or water, said polyester-polyurethane being dissolved or dispersed into said organic liquid and/or water, as described hereinbefore, gives a firm bonding between the shaped article of crystalline polyester and rubber. In the bonding of the shaped article of the crystalline polyester to rubber according to this invention, such resorcinol Formalin latex may be used together with the adhesive agent of this invention, whereby a more firm bonding is obtained.

The adhesive agent (adhesive composition) of the invention can be prepared by any method known per se, e.g., by dissolving the polyester-polyurethane in an organic solvent to obtain a solution or by further pouring said solution into water or another organic liquid which is miscible or immiscible with said organic solvent used to prepare said solution. As the solvent to dissolve the polyester-polyurethane, such compounds as dimethyl formamide and dimethyl sulfoxide which are miscible with water, and meta-cresol which is immiscible with water can be cited. The so obtained solution can be used as the adhesive agent of this invention.

On the other hand, a solid dispersion containing a finely divided polyester-polyurethane in water is obtained by pouring a solution of the polyester-polyurethane in dimethyl formamide or dimethyl sulfoxide into water. Further, a liquid dispersion in which a solution of the polyester-polyurethane in an organic solvent is finely dispersed in water is obtained, for instance, by pouring a solution of the polyester-polyurethane in meta-cresol into water. The same solid dispersion or liquid dispersion of the polyester-polyurethane can be obtained by substituting other organic solvent for the water in the above-mentioned procedures. Such solid dispersion or liquid dispersion of the polyester-polyurethane can also be used as the adhesive agent of this invention.

In the present invention, it is possible to introduce alkali metal sulfonate groups such as sodium sulfonate or potassium sulfonate for the purpose of increasing the water-dispersibility of the polyester-polyurethane. Thus, a very stable water dispersion can be obtained. When it is desired to prepare a water dispersion of the polymer having poor water dispersibility, it is preferable to first dissolve the polymer in an organic solvent such as meta-cresol and emulsify said solution with a proper emulsifier in water. Also, a uniform aqueous solution can be obtained by increasing the content of the sulfonate groups in the polyester-polyurethane.

One convenient method of introducing alkali metal sulfonate groups into a polyurethane polymer is to use a difunctional compound containing an alkali metal sulfonate group instead of whole or a part of said difunctional chain extending agent. As examples of a proper difunctional compound containing an alkali metal sulfonate group, there may be cited, for instance, sodium 2,5-di($\beta$-hydroxyethoxy) benzenesulfonate, potassium 3,5-di(carbo-$\beta$-hydroxyethoxy)-sulfonate, sodium 4,5-di($\beta$-hydroxyethoxy)-2,7-naphthalenedisulfonate, sodium 3 - hydroxyethoxy-5-carboxy-benzenesulfonate, sodium 2 - amino-4-(carbo-$\beta$-hydroxyethoxy) benzene sulfonate and sodium 4,4'-diaminodiphenyl-3-sulfonate. In order to introduce alkali metal sulfonate groups, it is possible to use together with or instead of these difunctional compounds, a monofunctional compound containing an alkali metal sulfonate group such as sodium 3-hydroxyethoxybenzenesulfonate and sodium 3-hydroxypropane-1-sulfonate.

Still another convenient process for producing a polyester polyurethane polymer having alkali metal sulfonate groups is to use a crystalline polyester having a high melting point modified by a modifier containing an alkali metal sulfonate group. As examples of such a modifier, there may be cited sodium 3,5-di(carboxyethoxy) benzenesulfonate, sodium 2,5-bis(hydroxyethoxy) benzenesulfonate, sodium 2-(carbo-$\beta$-hydroxyethoxy)-5-hydroxyethoxybenzenesulfonate and potassium 4,4'-di(carbomethoxy)-diphenyl-2-sulfonate.

It has been found that a remarkable water dispersibility is obtained when the polyester polyurethane polymer contains at least 0.05% by weight, preferably at least about 0.1% by weight, calculated as sulfur, of an alkali metal sulfonate.

Accordingly, the preferable adhesive agent having an improved water dispersibility for bonding a shaped article of an ethylene terephthalate polyester of this invention is a polyester polyurethane polymer containing polyester segments derived from an ethylene terephthalate polyester modified by up to 1.5 mol. percent, based on the total terephthalic acid component, of a chain branching agent (for instance, pentaerythritol), said modified polyester having a reduced viscosity of 0.10 to 0.30 measured at 35° C. in orthochlorophenol, in which the ratio of said polyester segments to the remaining segments of said polyester-polyurethane is 1:4 to 4:1 and said polyester-polyurethane contains as sulfur at least 0.05% by weight of an alkali metal sulfonate group based on the weight of said polyester-polyurethane. The upper limit of the sulfur content is not critical; however, from the practical viewpoint, it usually does not exceed about 4% by weight. These preferable polyester-polyurethane are conveniently produced by reacting conventionally (A) an ethylene terephthalate polyester modified by up to 1.5 mol percent based on the terephthalic acid component of a chain branching agent (for instance, pentaerythritol) and having a reduced viscosity of 0.10 to 0.30 measured at 35° C. at a concentration of 1.2 g./100 cc. of orthochlorophenol with (B) at least one difunctional chain extender selected from the group consisting of diol, diamine, aminoalcohol and dihydrazide, and (C) an organic diisocyanate such that (1) a weight ratio of said ethylene terephthalate polyester (A) to said chain extender (B) plus said organic diisocyanate is 1:4 to 4:1 and (2) as whole or a part of said chain extender, a difunctional chain extender containing an alkali metal sulfonate group is used in an amount sufficient to give at least 0.05% by weight of a sulfur content to the final polyester-polyurethane. If the said modified ethylene terephthalate polyester of (A) already contains an alkali metal sulfonate group, a chain extender containing a sulfonate group does not have to be used or it may be used in smaller amount.

Water dispersibility of the polyester-polyurethane may also be improved by introducing into said polymer a tertiary amino group and neutralizing said tertiary amino group-containing polymer by such an acid as hydrochloric acid and acetic acid. Introduction of the tertiary amino group is conveniently carried out by using a difunctional chain extender containing a tertiary amino group instead of a part (for instance, 30 mol percent) of said difunctional chain extender upon producing the polyester-polyurethane, or using a diol containing a tertiary amino group as a part of the diol component used for the production of a crystalline polyester. As examples of compounds containing a tertiary amino group, there are N-alkyldiethanolamines such as N-methyldiethanolamine, N-cyclohexyldiethanolamine, N-n-butyldiethanolamine and N-t-butyldiethanolamine.

Application of the adhesive agent to the shaped article may be carried out by optional operations known in the art. It is possible to apply the adhesive agent to the shaped article in the form of solution or in the form of solid or liquid dispersion as already explained hereinbefore. The shaped article may be treated with the adhesive composition by dipping, padding, spraying and other proper process known in the art. The treated shaped article is, if desired, preliminarily dried, thereafter heated to a temperature from 100° C. to below the melting point of the shaped article, preferably within the range of from 170° C. to 240° C. The applying amount of the coating agent to the shaped article, which may be termed a resin pickup depends upon the shape of the shaped article and the using object of the final product. The resin pickup for tire cord varies within the range of about 0.2–15% by weight, preferably 1–10% by weight.

A shaped article coated with the adhesive agent of this invention has an improved adhesion to rubbers. Further, such a shaped article has an excellent dynamic adhering life in its adhering to rubbers. The adhering ability of the article coated with the adhesive agent of this invention can be maintained for a long period. The coated product substantially retains the initial improved adhering capacity to rubbers after 6-month storage. Such coated product may be more strongly bonded to rubbers by the help of an adhesive usually used for adhering of, for instance, rayon fiber material and a polyamide fiber material to rubbers such as resorcinol Formalin latex.

The folowing examples are for explaining this invention and unless otherwise indicated parts in examples show parts by weight and viscosity is measured at a concentration of 1.2 g./100 cc. of orthochlorophenol at 35° C. The Heat-test was conducted as follows:

Using a stainless steel mold designed for H-test, one portion of the cord, 9 mm. in length, was held securely between a pair of pads of an unvulcanized rubber compound, 3 mm. in thickness. At some distance away another portion of the same cord, measuring 9 mm. long, was also secured in the same manner between a different pair of rubber pads, 3 mm. in thickness, and the vulcanization was effected at a temperature of 135° C. under a pressure of 15 kg./cm.$^2$ for 50 minutes. On 20 samples, the load to pull out the cord from the vulcanized rubber sheet was measured.

Dynamic adhering test was conducted as follows by using a Scott's tester.

To a rotatable cylinder, a sample in a shape of a long strip of paper consisting of a cord, rubber and cotton cloth was hung with the cord placed outwardly, the both ends of the sample were inserted by fasteners and by rising and following the sample, elongation and bending were imparted to the sample under the following conditions.

Load—8 kg./1100 den. x 2-ply cord, number of twist: 51 x 51 T/10 cm.
Bending cycle—200 r.p.m.
Bending cylinder diameter—30 mm.
Temperature—20° C.

The time when peeling occurred between the cord and the rubber (minutes) was measured and termed the dynamic adhering life.

The unvulcanized rubber blend used in Examples 1–7 and Controls 1–4 had the following composition A, and composition of the rubber B used in Examples 1 and 7 was shown below.

(A)

| | |
|---|---|
| Natural rubber | 100 |
| ZnO | 20 |
| Stearic acid | 3 |
| Seast #305 HAF | 50 |
| Aging resister PA | 1 |
| Pine tar | 1.5 |
| Sulfur | 3 |
| Coumarone HM | 2.5 |
| Vulcanization accelerator M $^1$ | 1 |
| Parts by weight per 100 parts of rubber | 182 |

(B)

| | |
|---|---|
| SBR | 100 |
| ZnO | 20 |
| Stearic acid | 1.5 |
| Channel black | 40 |
| Sulfur | 2 |
| Vulcanization accelerator DM$^2$ | 1.75 |
| Parts by weight per 100 parts of rubber | 150.25 |

$^1$ M: Mercaptobenzothiazole.
$^2$ DM: Benzothiazyldisulfide.

The resorcinol Formulin latex used in the following examples was prepared under the following conditions.

Solution A:

| | Parts |
|---|---|
| Resorcinol | 1.85 |
| 37% Formalin | 2.75 |
| Water | 18.00 |
| 10% NaOH | 0.50 |

Solution B:

| | |
|---|---|
| Butadienevinyl-pyridine-latex (40%) | 36.5 |
| Natural rubber latex (60%) | 6.0 |
| Water | 34.5 |

The mixed solution was adjusted to pH 8.5 by 10% NaOH.

Solution A was condensed at 20° C. for 6 hours, thereafter it was mixed with solution B and the mixture matured for at least 24 hours was used.

CONTROL 1

20.0 parts of polyethylene sebacate having a reduced viscosity of 0.210 were dissolved in a nitrogen atmosphere at 150° C. in 300 parts of dimethyl sulfoxide, to said solution 16.1 parts of diphenylmethane diisocyanate were added with stirring, further, 3.7 parts of ethylene glycol dissolving therein 0.016 part of triethyldiamine were added. At said temperature, stirring was continued for 1 hour, and the mixture was poured into 3,000 parts of water. The precipitated polymer was filtered, washed with water and dried in a reduced pressure drier. This polymer was so dissolved at 135–140° C. in dimethylformamide that it might become 1% by weight therein, and at said temperature a high tenacity polyethylene terephthalate yarn (1100 den. x 2-ply cord, number of twist: 50 x 50 T/10 cm.) was immersed in said solution for 3 minutes, dried at 80° C. for 30 minutes under atmospheric pressure, thereafter heat treated at 80° C. for 5 minutes, respectively at a constant length. The resin pickup due to this immersion treatment was 1.2% by weight. The so treated yarn was treated with the same resorcinol Formalin latex adhering solution as used in Example 1, and heat treated at 200° C. for 1.5 minutes. The adhering strength of the obtained cord to rubber A according to H-test was average 9.8 kg. only.

CONTROL 2

10.0 parts of polyethylene terephthalate copolymerizing with 0.4 mol percent of pentaerythritol and having a reduced viscosity of 0.190 were dissolved in 150 parts of dimethyl sulfoxide in a nitrogen atmosphere at 150° C., to which solution 81.0 parts of diphenyl methane diisocyanate were added with stirring, further 0.081 part of triethylene diamine dissolved in 19.0 parts of ethylene glycol was added, stirring was continued for 1 hour and the mixture was poured into 3,000 parts of water.

The precipitated polymer was filtered, washed with water and dried in a reduced pressure drier. This polymer was so dissolved at 120° C. in dimethyl formamide that the polymer might become 1% by weight therein, and at said temperature a high tenacity polyethylene terephthalate yarn (1100 den. x 2-ply cord, number of twist: 51 x 51 T/10 cm.) was immersed in said solution for 3 minutes, dried at 80° C. for 3 minutes under atmospheric pressure, and then heat treated at 180° C. for 5 minutes, respectively at a constant length. The resin pickup in this immersion treatment was 1.6% by weight. The yarn was treated with the same resorcinol Formalin latex adhering solution as used in Example 1, further, heat treated at 210° C. for 3 minutes. The adhering strength of the obtained cord to rubber A according to H-test was average 9.0 kg.

CONTROL 3

Ninety parts of polyethylene terephthalate copolymerizing 0.8 mol percent of pentaerythritol and having a reduced viscosity of 0.195 were dissolved in 800 parts of dimethyl sulfoxide in a nitrogen atmosphere at 150° C., to which solution 9.76 parts of diphenyl methane diisocyanate, 0.24 part of ethylene glycol and 0.0098 part of triethylene diamine were added with stirring to carry out a polymerization for 60 minutes. The reaction mixture was poured into 7,000 parts of water.

The precipitated polymer was filtered, washed with water and dried in a reduced pressure drier. This polymer was so dissolved at 135–140° C. in dimethyl formamide that the polymer might become 1% by weight therein, and at said temperature a high tenacity polyethylene terephthalate yarn (1100 den. x 2-ply cord, number of twist: 51 x 51 T/10 cm.) was immersed in said solution, dried at 80° C. for 3 minutes under atmospheric pressure and then heat treated at 18° C. for 5 minutes, respectively at a constant length. The resin pickup in this immersion treatment was 1.3% by weight. The yarn was treated with the same resorcinol Formalin latex adhering solution as used in Example 1, and heat treated at 220° C. for 15 minutes. The adhering strength of the obtained cord to rubber A according to H-test was average 9.5 kg.

EXAMPLE 1

17.1 parts of polyethylene terephthalate having been copolymerized with 1.6 mol percent of pentaerythritol and having a reduced specific viscosity of 0.128 were dissolved in a nitrogen atmosphere in 450 parts of nitrobenzene, to which 100 parts of a nitrobenzene solution containing 20.8 parts of polybutadiene (number average molecular weight of 4,000) and 0.009 part of dibutyl tin laurate were added. To the resultant solution, 3.70 parts of diphenylmethane diisocyanate were added with stirring and the mixture was stirred at 150° C. for 1 hour. By re-precipitating with methanol, a copolymer was obtained. In a 15% by weight a solution wherein said copolymer was dissolved in dimethyl formamide, a 1100-denier 2-ply cord made of high tenacity polyethylene terephthalate yarn was immersed and heat treated at 220° C. for 3 minutes under the constant length. The obtained cord was buried in said blended rubber A and said rubber was vulcanized at 160° C. under pressure for 60 minutes using dicumyl peroxide as a vulcanization accelerator. The adhesion strength by the H-test method was average 13.6 kg.

EXAMPLE 2

12.12 parts of polyethylene terephthalate having been copolymerized with 0.8 mol percent of pentaerythritol and having a reduced specific viscosity of 0.146 were dissolved in a nitrogen atmosphere in 200 parts of nitrobenzene at 160° C., to which 100 parts of a nitrobenzene solution containing 36.35 parts of polybutadiene glycol (number average molecular weight of 1,340) and 0.009 part of dibutyl tin dilaurate were added. To the resultant solution, 8.73 parts of diphenylmethane diisocyanate were added with stirring and stirring was carried out for 1 hour. In the resultant mixed solution a 1100-denier 2-ply cord made of a high tenacity polyethylene terephthalate yarn (number of twist: 51 x 51) was immersed and dried under a reduced pressure at 60° C. under the constant length. The dried cord was heat treated at 190° C. for 3 minutes. The adhesion strength of the obtained cord to said blender rubber A was average 12.3 kg. by H-test method.

EXAMPLE 3

70.80 parts of a polyethylene isophthalate-terephthalate copolyester having been copolymerized with 0.8 mol percent of pentaerythritol and having a reduced specific viscosity of 0.252 (isophthalic acid/terephthalic acid=1/5), 1260 parts of polybutadiene glycol (molecular weight: 1,000) and 0.004 part of dibutyl tin dilaurate were dissolved in a nitrogen atmosphere in 700 parts of nitrobenzene at 150° C. To the resultant solution, 3.605 parts of 1,4-diphenylene diisocyanate were added with stirring, the two were reacted at 150° C. for 1 hour, thereafter, the reaction solution was thrown into methanol to precipitate a polymer. After filtering, the polymer was dried inside a reduced-pressure drier. In a dimethyl formamide solution of said polymer, a 1100-denier 2-ply cord made of a high tenacity polyethylene terephthalate yarn (number of twist: 51 x 51) was immersed. After immersion, said cord was dried under atmospheric pressure at 80° C. for 30 minutes, thereafter, said cord was heat treated at 180° C. for 5 minutes sequentially under the constant length. Said cord was treated with a chloroform solution containing tetrabutyl thiuram disulfide and dried with air. The adhesion strength of the obtained cord to said blended rubber A was average 12.8 kg. by the H-test method.

EXAMPLE 4

25.4 parts of polyethylene terephthalate having been copolymerized with 0.8 mol percent of penteaerythritol and having a reduced specific viscosity of 0.131 were dissolved in a nitrogen atmosphere in 320 parts of nitrobenzene at 160° C., to the resultant solution, 5.10 parts of polybutadiene glycol (number average molecular weight of 510), 3.60 parts ethylene glycol and 200 parts of nitrobenzene containing 0.024 part of dibutyl tin dilaurate were added. To the obtained solution, 24.0 parts of diphenylmethane diisocyanate were added with stirring and stirring was carried out at 150° C. for 1 hour. In a 5% solution of this copolymer a 1100-denier 2-ply cord made of high tenacity polyethylene terephthalate yarn (number of twist: 51 x 51) was immersed and heat treated at 240° C. for 3 minutes under the constant length. Next, said cord was immersed in said liquid consisting of resorcinolformaldehyde latex and heat treated at 210° C. for 3 minutes. The obtained cord was buried in said blended rubber A and vulcanized at 145° C. under pressure. The adhesion strength was average 15.1 kg. by the H-test method.

EXAMPLE 5

10.00 parts of polyethylene terephthalate having been copolymerized with 0.8 mol percent of pentaerythritol, having a reduced specific viscosity of 0.176 were dissolved in a nitrogen atmosphere at 140° C. in 100 parts of dimethyl sulfoxide. To the resultant solution, 4.78 parts of diphenylmethane diisocyanate and 0.0038 part of triethylene diamine were added, the mixture was stirred for 10 minutes, thereafter, it was added with 40.00 parts of unsaturated polyether obtained by ring opening polymerizing allyl glycidylether represented by the formula

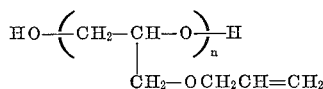

(n: about 35) and dissolved in 50 parts of dimethyl sulfoxide for a period of 5 minutes. Further in a nitrogen atmosphere at 140° C. the mixture was stirred for 1 hour. Thereafter, the obtained solution was thrown into 1000 parts of water. A polymer was filtered, washed with water and dried in a reduced pressure drier. Said polymer was so dissolved at 135–140° C. in dimethyl formamide that its concentration might become 13.0% by weight, in the obtained solution at said temperature a 1100-denier 2-ply cord made of a high tenacity polyethylene terephthalate (number of twist: 51 x 51 T/10 cm.) was immersed for 3 minutes, dried at 80° C. under atmospheric pressure, thereafter heat treated at 220° C. for 3 minutes under the constant length in this sequence.

Said cord was buried in said blended rubber A, which rubber was vulcanized at 160° C. for 60 minutes using dicumyl peroxide as a vulcanization accelerator. The adhesion strength was average 12.6 kg. by the H-test method.

EXAMPLE 6

10.00 parts of polyethylene terephthalate having been copolymerized with 0.8 mol percent of pentaerythritol, having a reduced specific viscosity of 0.176 were dissolved in a nitrogen atmosphere at 140° C. in 100 parts of dimethyl sulfoxide. To the resultant solution, 5.52 parts of diphenyl methane diisocyanate and 0.0042 part of triethylene diamine were added. The mixture was stirred for 10 minutes, thereafter, it was added with 10.00 parts of unsaturated polyether obtained by ring opening polymerizing allyl glycidyl ether represented by the formula

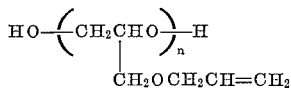

n: about 35 and 20.00 parts of polybutadiene glycol (molecular weight: 4,000) both dissolved in 50 parts of dimethyl sulfoxide were added for a period of 5 minutes. The mixture was further stirred in a nitrogen atmosphere at 140° C. for 1 hour. Thereafter, the mixed solution was thrown into 1000 parts of water. A polymer was filtered, washed with water and dried under a reduced pressure.

Said polymer was so dissolved in dimethyl formamide that its concentration might become 13.0% by weight at 135–140° C., at said temperature in the obtained solution a 1100-denier 2-ply cord made of a high tenacity poly- ethylene terephthalate (number of twist: 51 x 51 T/10 cm.) was immersed for 3 minutes, dried at 80° C. under atmospheric pressure for 3 minutes and heat treated at 220° C. for 3 minutes under the constant length in this sequence. Said cord was buried in said blended rubber A, said rubber was vulcanized at 160° C. for 60 minutes using dicumyl peroxide as a vulcanization accelerator. The adhesion strength of said cord to said rubber was average 13.1 kg. by H-test method.

EXAMPLE 7

10.00 parts of polyethylene terephthalate having a reduced viscosity of 0.164 were dissolved in 120 parts of dimethyl sulfoxide in a nitrogen atmosphere at 140° C. to said solution 6.00 parts of polyethylene itaconate having a low degree of polymerization (DP: about 5) and 0.0030 part of triethylene diamine were added, and 3.00 parts of diphenylmethane diisocyanate were further added with stirring. At said temperature, stirring was continued for 1.0 hour and the mixture was poured into 1,200 parts of water. The precipitated polymer was filtered, washed with water and dried in a reduced pressure drier. This polymer was so dissolved at 120° C. in dimethyl formamide that the polymer might become 1.0% by weight therein, and at said temperature the same polyethylene terephthalate cord as in Example 1 was immersed for 3 minutes, dried at 80° C. for 30 minutes under a reduced pressure, and then heat treated at 180° C. for 5 minutes, respectively at a constant length. This treated cord was treated with the resorcinol Formalin latex, thereafter heat treated at 210° C. for 1.5 minutes. The adhering strength of the obtained cord to rubber A according to the H-test was average 15.6 kg.

What we claim is:

1. A bonded article comprising rubber bonded to a shaped article of a crystalline ethylene terephthalate polyester wherein at least 60 mol percent of the structural units consist of ethylene terephthalate units or a crystalline ethylene 2,6-naphthalate polyester wherein at least 60 mol percent of the structural units consist of ethylene 2,6-naphthalate units, said rubber and shaped article being bonded by an adhesive comprising a polyester-polyurethane in which the polyester segments (a) constitute ⅐ to ⁶⁄₇ by weight of the polyester-polyurethane and (b) contain 60 mol percent ethylene terephthalate units when the substrate is an ethylene terephthalate polyeser or 60 mol percent ethylene 2,6-naphthalate units when the substrate is ethylene 2,6-naphthalate polyester, and in which the remaining segments of the polyester-polyurethane are derived from an organic diisocyanate and a difunctional chain extender, at least a part of said chain extender containing ethylenic unsaturation in its molecule, said remaining segments containing ethylenic unsaturations in an amount of at least one per 500 of the molecular weight of said polyester-polyurethane.

2. The bonded article of claim 1 wherein in said adhesive the amount of said ethylenic unsaturations is at least one per 300 of the molecular weight of said polyester-polyurethane.

3. The bonded article of claim 1 wherein in said adhesive said ethylenic unsaturations are derived from polybutadiene glycol as a chain-extender.

4. The bonded article of claim 1 wherein in said adhesive said ethylenic unsaturations are derived from polybutadiene dicarboxylic acid as a chain-extender.

5. The bonded article of claim 1 wherein in said adhesive the polyester-polyurethane contains alkali metal sulphonate groups.

6. The bonded article of claim 1 wherein in said adhesive the polyester-polyurethane contains ethylene terephthalate polyester segments modified by up to 2 mol percent, based on the terephthalic acid component, of a chain branching agent having 3 or 4 ester-forming groups.

7. The bonded article of claim 1 wherein in said adhesive the polyester segments are derived from polyethylene terephthalate or a modified polyethylene terephthalate having a reduced viscosity of 0.10 to 0.30 measured at 35° C. in o-chlorophenol.

8. The bonded article of claim 1 wherein in said adhesive the polyester segments constituted 1/5–4/5 by weight of the polyester-polyurethane.

References Cited

UNITED STATES PATENTS

| | | | |
|---|---|---|---|
| 3,035,475 | 5/1962 | Rinke et al. | 117—138.8F |
| 3,268,467 | 8/1966 | Rye et al. | 117—138.8F |
| 3,401,151 | 9/1968 | Wieden et al. | 260—77.5AM |

WILLIAM D. MARTIN, Primary Examiner

J. E. MARTIN, Jr., Assistant Examiner

U.S. Cl. X.R.

117—77, 138.8, 161, 162; 260—75